United States Patent [19]

Stocker

[11] Patent Number: 5,475,623
[45] Date of Patent: Dec. 12, 1995

[54] METHOD FOR THE CONVERSION OF A MEASURED SIGNAL, A CONVERTER AS WELL AS A MEASUREMENT SETUP AND A PIRANI MEASURING CIRCUIT

[75] Inventor: Rudolf Stocker, Azmoos, Switzerland

[73] Assignee: Balzers Aktiengesellschaft, Fuerstentum, Liechtenstein

[21] Appl. No.: 386,597

[22] Filed: Feb. 10, 1995

Related U.S. Application Data

[63] Continuation of Ser. No. 93,734, Jul. 20, 1993, abandoned.

[30] Foreign Application Priority Data

Jul. 20, 1992 [CH] Switzerland ............ 02278/92

[51] Int. Cl.$^6$ .................................................. G01G 23/48
[52] U.S. Cl. ................ 364/571.02; 327/350; 73/755; 364/558
[58] Field of Search ........................ 364/571.02, 558; 327/350; 73/755, 700

[56] References Cited

U.S. PATENT DOCUMENTS

| | | |
|---|---|---|
| 2,030,956 | 2/1936 | Barker. |
| 3,580,081 | 5/1971 | Greenburg et al. ............ 73/399 |
| 3,700,918 | 10/1972 | Kawashima ............ 307/230 |
| 4,004,141 | 1/1977 | Curtis ............ 235/194 |
| 4,541,286 | 9/1985 | Holme ............ 73/755 |
| 4,604,532 | 8/1986 | Gilbert ............ 307/490 |
| 4,983,863 | 1/1991 | Tanno. |
| 4,995,264 | 2/1991 | Stocker et al. ............ 73/702 |
| 5,012,140 | 4/1991 | Bateman ............ 307/491 |
| 5,136,192 | 8/1992 | Kooijman ............ 307/492 |
| 5,252,864 | 10/1993 | Kooijman ............ 307/492 |
| 5,327,029 | 7/1994 | Ericson et al. ............ 307/491 |

FOREIGN PATENT DOCUMENTS

3742334A1 11/1988 Germany.
2105047 8/1982 United Kingdom.

OTHER PUBLICATIONS

Hidber et al., "Pirani Manometer with Linearized Response", Aug. 1976, (Abstract only).

*Primary Examiner*—Ellis B. Ramirez
*Assistant Examiner*—Patrick J. Assouad
*Attorney, Agent, or Firm*—Evenson, McKeown, Edwards & Lenahan

[57] ABSTRACT

A method and apparatus for converting a measured signal which, at least in a first approximation, is related to a quantity of interest by the equation (a):

$$y = k_1 \frac{x^2 - k_N^2}{k_Z^2 - x^2}$$

where y is the quantity of interest, x is the measured signal, and k, $k_N$, $k_Z$ are constants, into a signal that is a function of the quantity of interest. The method implements the function (b):

$$\ln y = \text{prop.} ([\ln (x - k_N) - \ln (k_Z - x)])$$

wherein prop. means proportional, and where the function is implemented in an approximated manner by at least two bipolar transistors that have base emitter voltages that are dependent on collector currents of the bipolar transistors for receiving an output signal according to the equation (c): y'=ln y, with y' being the output signal.

16 Claims, 5 Drawing Sheets

METHOD FOR THE CONVERSION OF A MEASURED SIGNAL, A CONVERTER AS WELL AS A MEASUREMENT SETUP AND A PIRANI MEASURING CIRCUIT

This application is a continuation of application Ser. No. 08/093,734, filed on Jul. 20, 1993 now abandoned.

BACKGROUND AND SUMMARY OF THE INVENTION

The present invention relates to a method for converting a measured signal, which, at least in a first approximation, is related to a quantity of interest by the equation $$y = k_1 \frac{x^2 - k_N^2}{k_Z^2 - x^2}$$

(where y is the quantity that is of interest, x is the measured signal, and $k_1$, $k_N$ and $k_Z$ are constants) into a signal that is a function of the quantity of interest.

The present invention also relates to a converter for the conversion of a measured signal which is at least approximately related to a quantity of interest according to the equation (a):

$$y = k_1 \frac{x^2 - k_N^2}{k_Z^2 - x^2}$$

where y is the quantity of interest, x is the measured signal, and $k_1$, $k_N$ and $k_Z$ are constants.

The present invention further relates to a measurement arrangement comprising a sensor for sensing a quantity of interest to be sensed, the sensor emitting a measuring signal.

The present invention still further relates to a Pirani measuring circuit comprising a bridge circuit with a Pirani element.

In the field of sensory technology, the tendency can be observed to shift more and more tasks into the measuring head or the measuring sensor device which previously had been carried out in an analyzing unit. Thus, for example, more and more active measuring bridges, signal amplifiers and processing circuits as well as linearizing circuits, analog-to-digital converters, etc. are shifted into the measuring head. For some time, this has also been observed in sensors that provide total pressure measurements. This results in the advantages that in a thermally coupled manner a better and more stable-adaptation of the analyzing electronic system to the actual sensor can be achieved in a small space; that coupled-in signal errors on the transmission path between the sensor and the analyzing unit are eliminated; and that measuring head output signals, feeds, etc. can be standardized in such a manner that various measuring heads are freely exchangeable and even different measuring head types can partially be exchanged with one another at standardized interfaces of an analyzing unit.

In some cases, active sensors of this type may be connected directly to the analog-to-digital converter input of analyzing computers.

Although one aspect of the present invention relates to measured signals in general which are a function, as illustrated and explained later in equation (4b), of a physical quantity that is of interest and that is detected by the sensor, the present invention relates particularly to the analysis of measuring signals which are sensed at hot-wire vacuum or "Pirani" vacuum gauges.

Normally, vacuum gauges have output signals which, in a manner that is specific with respect to the measuring principle, are a function of the pressure detected by the sensor. This means that the output signal of the measuring heads must first be converted into pressure values by a calibrating curve or a calibrating table.

The thermal conductivity of gases, which is evaluated, at low pressures (below approximately $10^{-2}$ mbar) as well as at high pressures (above approximately 10 mbar) will asymptotically approach constant values. Since in these ranges the conductivity dependency on the pressure becomes low and the dependency curve becomes flat, the measuring sensitivity will therefore be poor, particularly in these ranges. Furthermore, in these ranges, the measurement is increasingly susceptible to disturbances because of the poor signal-to-noise ratio which exists there.

If measuring is to take place in these ranges while using analog-to-digital converters, these converters must have a high resolution and precision for this purpose which, because of the quantization error, requires a high number of steps of the analog-to-digital converters.

From U.S. Pat. No. 4,983,863, it is known to form two signals which are proportional to the natural logarithm (ln) of two input signals while utilizing the base emitter voltage of two bipolar transistors and to subtract them so that a signal is obtained which corresponds to the ln of the input signal quotient. Thus, an output signal is provided which is directly proportional to the in of the input signal quotient.

Furthermore, reference is made to German Patent Document DE-A-37 42 334, British Patent Document GB-A-2 105 047, which corresponds to German Patent Document DE-A-32 30 405 (discussed in the following), as well as U.S. Pat. No. 2,030,956.

In one of its aspects, the present invention has the object of providing in a simple manner easily interpretable output signal characteristics from a measuring signal of the above-described type, particularly from the signal sensed by a hot-wire vacuum gauge arrangement. "Easily interpretable" means in this case that it should be possible to easily draw conclusions from these characteristics with respect to the quantity detected by the sensor which is of interest.

Furthermore, with respect to the quantity that is of interest, as in the case of a vacuum gauge with respect to the measured pressure, a large measuring range must be achieved, preferably over six decades and more, with a precision that is in the order of 10%.

These and other objects are achieved by the present invention which provides a method for converting a measured signal which, at least in a first approximation, is related to a quantity of interest by the equation (a):

$$y = k_1 \frac{x^2 - k_N^2}{k_Z^2 - x^2}$$

where y is the quantity of interest, x is the measured signal, and $k_1$, $k_N$, $k_Z$ are constants, into a signal that is a function of the quantity of interest. The method comprises implementing the function (b):

ln y=prop. ([ln $(x-k_N)$–ln $(k_Z-x)$])

wherein prop. means proportional, and where the function is implemented in an approximated manner by at least two bipolar transistors that have base emitter voltages that are dependent on collector currents of the bipolar transistors for receiving an output signal according to the equation (c): $y'=\ln y$, with $y'$ being the output signal.

In comparison to a known projection for correcting the dependency between measured quantities (particularly of the voltage on a Pirani gauge) and the quantity that is of interest (in the known case, the pressure) by means of diode networks, the expenditures of the present invention are extremely low. Furthermore, the ripple of the characteristic curve is significantly reduced, and pressures can be detected with the desired precision over a significantly larger range.

In contrast to another known approach of obtaining in a limited pressure range of approximately $10^{-4}$ to 1 mbar, an output signal which is linearly dependent on the pressure by analog multiplication techniques, as known from H. R. Hidber, et al., *Rev.Sci.Instrum.* 47, Page 912 (1976), a significantly larger measuring range is achieved as a result of the logarithmic pressure dependency realized according to the present invention, while the signal range of analyzing amplifiers is given.

Also the use of analog logarithmizers, as known from M. Wutz, et al., *"Theory and Practice of Vacuum Technology"*, F. Vieweg & Sohn, Braunschweig, 1988, Page 413, permits only the analysis in a pressure range of from $5 \cdot 10^{-3}$ mbar to 10 mbar.

As mentioned above, according to the present invention, a signal that is of interest and that changes over more than six decades is to be detectable; that is, on a hot-wire vacuum gauge, a pressure range of at least $10^{-3}$ to $10^3$ mbar.

The aforementioned objects are also achieved by another embodiment of the present invention which provides a converter for the conversion of a measured signal which is at least approximately related to a quantity of interest according to the equation (a):

$$y = k_1 \frac{x^2 - k_N^2}{k_Z^2 - k^2}$$

where y is the quantity of interest, x is the measured signal, and $k_1$, $k_N$ and $k_Z$ are constant. The converter comprises a first converter bipolar transistor having a collector which is connected to receive a current proportional to $(x-k_N)$, and a second converter bipolar transistor having a collector which is connected to receive a current proportional to $(k_Z-x)$. The resultant base emitter voltages of the first and second converter bipolar transistors are subtracted from one another to form an output signal $\ln y = \text{prop.}(\ln(x-k_N) - \ln(k_{Z-x}))$.

According to an embodiment of the present invention, a sensor which emits a signal that is to be measured and is related to a quantity that is of interest, is combined with a converter. This combination allows a set of mutually coordinated measuring sensor devices to perform analyzing unit tasks.

The aforementioned objects are also achieved by an embodiment of the present invention which provides a measurement arrangement comprising a sensor for sensing a quantity of interest to be sensed, the sensor emitting a measuring signal, and a converter for the conversion of a measured signal which is at least approximately related to a quantity of interest according to the equation (a):

$$y = k_1 \frac{x^2 - k_N^2}{k_Z^2 - x^2}$$

where y is the quantity of interest, x is the measured signal, and constants. The converter includes a first converter bipolar transistor having a collector which is connected to receive a current proportional to $(x-k_N)$, and a second converter bipolar transistor having a collector which is connected to receive a current proportional to $(k_Z-x)$. The resultant base emitter voltages of the first and second converter bipolar transistors are subtracted from one another to form an output signal $\ln y = \text{prop.}(\ln(x-k_N) - \ln(k_Z-x))$.

A second aspect of the present invention is based on a known Pirani measuring bridge circuit, as illustrated in Wutz, et al., *"Theory and Practice of Vacuum Technology"*, F. Vieweg & Sohn, Braunschweig, 1988, Page 413. In this case, the Pirani element is connected into a branch of a Wheatstone Bridge. The output voltage of a measuring operational amplifier is fed, in the sense of a negative feedback, across the first bridge diagonal as the bridge operating voltage. The input of the operational amplifier constructed as a differential amplifier is disposed on the second diagonal of the Wheatstone bridge. In a branch of the Wheatstone bridge, a temperature compensation resistor is provided. A temperature compensation is provided because changes of the ambient temperature have the same effect on the Pirani element as pressure changes and therefore lead to errors of measurement. By means of the temperature compensation known from Wutz, the latter can be carried out precisely only in a limited pressure range.

Furthermore, it is known from German Patent Document DE-PS-32 30 405 to provide for the automatic temperature compensation on a Pirani measuring circuit in a bridge branch having a temperature-sensitive resistor as the temperature compensation element. This resistor is thermally coupled with another temperature sensitive resistor which, being connected in front of an input of an addition amplifier, feeds to the amplifier a signal derived from a reference voltage as a function of the temperature.

The second aspect of the present invention has the object, based on the known arrangement according to Wutz whose simplicity is to be maintained, of suggesting a temperature-compensated Pirani measuring circuit whose compensation, considering the measuring range, is even more precise than the much more complicated compensation circuit known from the above-mentioned patent document.

The objects of the invention are also achieved by an embodiment of the present invention which provides a Pirani measuring circuit comprising a bridge circuit with a Pirani element, the bridge circuit having a bridge branch with an intermediate tap, a voltage connected via resistors between a bridge point connected with the Pirani element and the intermediate tap, the bridge circuit including a temperature compensation element.

Other objects, advantages and novel features of the present invention will become apparent from the following detailed description of the invention when considered in conjunction with the accompanying drawings.

DETAILED DESCRIPTION OF THE DRAWINGS

The principle of thermal conductivity vacuum gauges or Pirani vacuum gauges is known, for example, from M. Wutz, et al., *"Theory and Practice of Vacuum Technology"*, F. Vieweg & Sohn, 4th Edition (1988), Page 409, and on.

Since the thermal conduction of a gas is a function of the gas pressure, the electrical heating power capacity is measured on a hot wire of a gauge head which is dipped into the gas to be measured, the wire temperature being maintained to be constant. Since the conduction balance will then be compensated, the fed electrical power $Q_{EL}$ will correspond to the power dissipated via heat conduction. It is known that the following dependency is obtained between the fed electrical power $Q_{EL}$ and the gas pressure p to be measured:

$$Q_{EL} = \epsilon \left( p_o + \frac{p}{1 + g \cdot p} \right) \quad (1)$$

wherein also:

ε is the sensitivity of the gauge head;

g is a factor which takes into account the geometry of the gauge head arrangement;

$p_o$ are interference effects which are to be equated with a zero pressure $p_o$.

Figure 1:
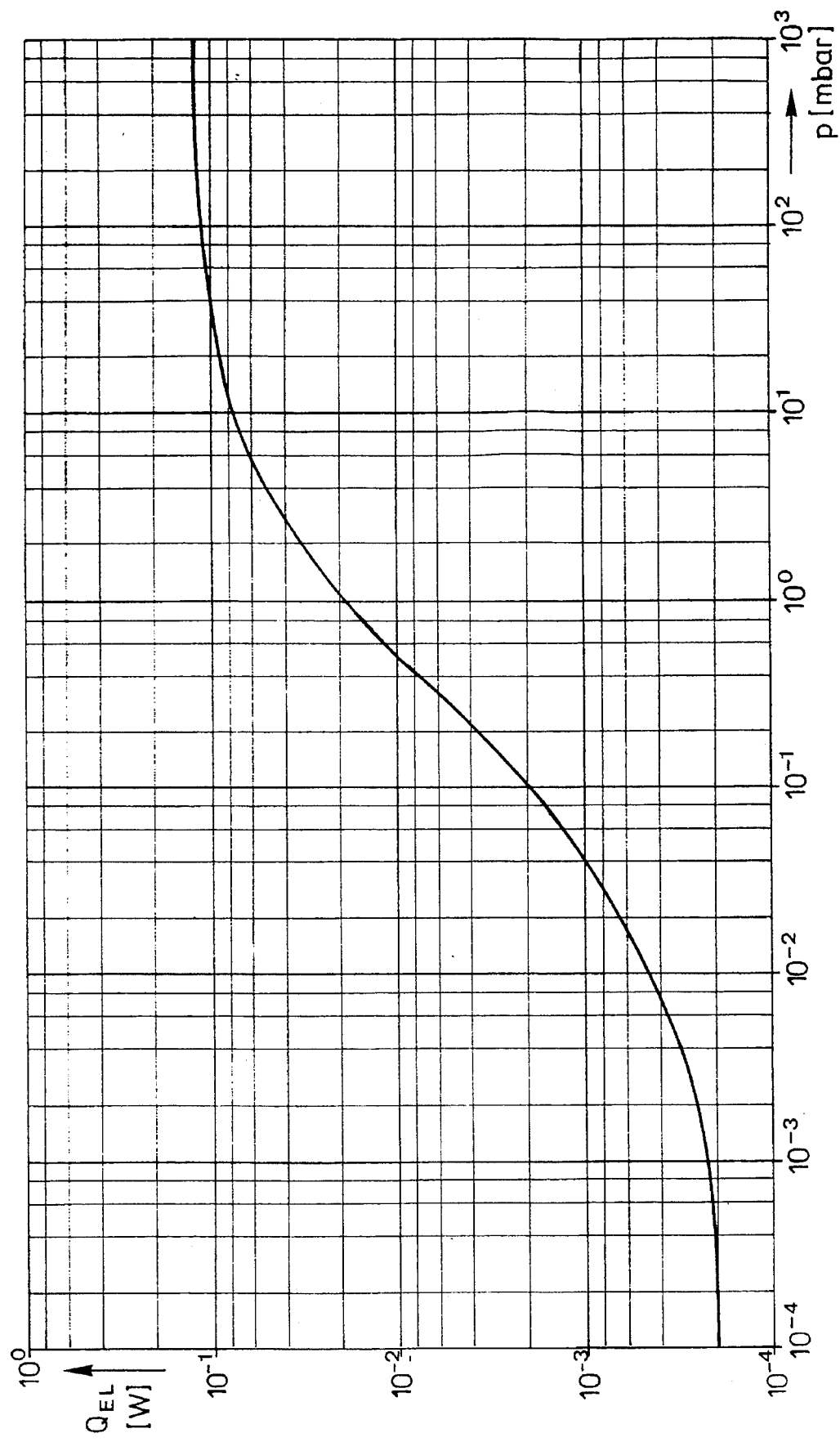
FIG. 1 is a log-log plot of the course of the electrical power $Q_{EL}$ fed to a Pirani vacuum gauge as a function of the pressure p of the measuring gas while the temperature of the hot wire is maintained constant.

FIG. 1 illustrates the dependency of the fed electrical power $Q_{EL}$ on the gas pressure p.

If (1) is resolved according to the gas pressure p, the following is obtained:

$$p = \frac{1}{g} \cdot \frac{Q_{EL} - \epsilon p_o}{\epsilon \left( p_o + \frac{1}{g} \right) - Q_{EL}} \quad (2)$$

When considered asymptotically, it is easily recognizable that the following terms have the indicated meanings:

$\epsilon p_o$ is the electrical power converted at very low pressures ($p \ll 10^{-4}$ mbar);

$\epsilon(p_o + 1/g)$ is the electrical power converted at high pressures ($p \gg 1$ bar).

The fed electrical power $Q_{EL}$ is obtained at:

$$Q_{EL} = \frac{U_D^2}{R_D} \quad (3)$$

wherein $U_D$ is the voltage across the hot wire and $R_D$ is the electric resistance of the pilot wire in the temperature-compensated condition; or at $$Q_{EL} = \frac{U^2}{4R_D} \quad (3a)$$

if, for example, according to Wutz, Page 413, U is the output voltage of the bridge.

The following is obtained from (2) with (3) or (3a):

$$p = \frac{1(U^2 - K_1)}{g(K_2 - U^2)} \quad (4)$$

or, when taking into account the above statements concerning asymptotic behavior:

$$p = \frac{1}{g} \cdot \frac{U^2 - U_o^2}{U_\infty^2 - U^2} \quad (4a)$$

wherein:

U: output voltage of the Pirani arrangement;

$U_o$: its asymptotic value at low pressures p;

$U_\infty$: its asymptotic value at high pressures p.

Dependencies, as they are illustrated in FIG. 1 specifically for the dependency of the gas heat conduction and of the gas pressure, may in principle occur in technology also elsewhere, for example, on non-linear networks, and the principle described in the following is also suitable for those types of cases. Accordingly, in order to draw a conclusion from a measured quantity x (corresponding to U on the vacuum gauge head according to (4a)), to a physical quantity y that is of interest (corresponding to the pressure p at the vacuum gauge) a generalized notation will be used in the following, and the following expression is obtained from (4a):

$$y = k_1 \frac{x^2 - k_N^2}{k_Z^2 - x^2} \quad (4b)$$

With a sufficient approximation, this expression may be replaced by $$y \approx a \left\{ \frac{x - k_N}{k_Z - x} \right\}^b \quad (5)$$

When (5) is logarithmized, the following is obtained $$\ln y \approx \ln a + b[\ln (x - k_N) - \ln (k_Z - x)] \quad (6)$$

or $$\ln y = \text{prop.} [\ln (x - k_N) - \ln (k_Z - x)] + \text{const.} \quad (6a)$$

or with the voltage on a Pirani vacuum gauge head $$\ln p \approx \ln a' + b'[\ln (U - U_o) - \ln (U_\infty - U)] \quad (6b)$$

or $$\ln p = \text{prop.} [\ln (U - U_o) - \ln (U_\infty - U)] + \text{const.} \quad (6c)$$

wherein "prop." means proportional.

In this case, the constants a' and b' are a function of the measurement setup. The pressure p and the quantity y that is of interest respectively appear as a logarithmic function of the measuring voltage U or the measuring signal x, which permits the detecting of an extremely large range of pressure in the case of a given output signal deviation analogous to the representation of FIG. 1.

Figure 2:
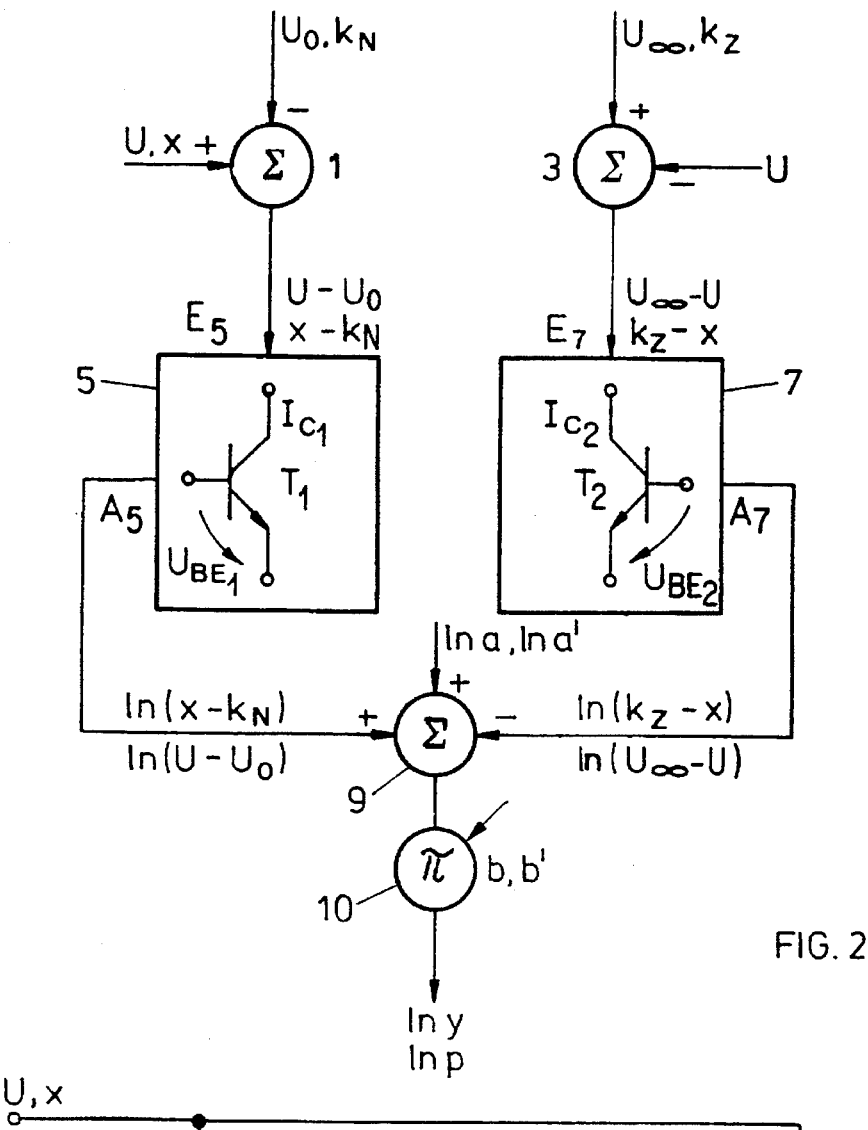
FIG. 2 is a schematic view of a representation according to analog programming techniques of the basic construction of a converter according to the present invention for explaining the method according to the invention.

FIG. 2 shows the analog programming of the expressions according to (6) and (6b). The quantities which relate to the Pirani vacuum gauge as well as the generalized quantities are both used in FIG. 2.

On two subtractors 1 and 3, the two differences, which must be logarithmized again, are formed according to expressions (6, 6b). The differential signals and respective dependent signals are fed to one function generator unit 5 and 7 respectively. The input signals on inputs $E_5$ and $E_7$ which correspond to the mentioned differences, and if necessary are convened correspondingly, are fed as collector currents $I_{C1}$ and $I_{C2}$ to one bipolar transistor $T_1$ and $T_2$ respectively. As the output quantity of the converters 5 and 7 on outputs $A_5$ and $A_7$, a signal is analyzed which is proportional to the respective base emitter voltage $U_{BE1}$ and $U_{BE2}$. It is known that the following dependency exists between the collector current $I_c$ and the base emitter voltage $U_{BE}$ on a bipolar transistor:

$$U_{BE} = \lambda^{-1} \cdot (\ln I_c - \ln I_s), \tag{7}$$

$$\lambda = \frac{e}{KT} \tag{7a}$$

wherein
with e: electron charge,

K: Boltzmann constant,

T: absolute temperature;
and furthermore $I_s$: the collector barrier current.

The two base-emitter-voltage-dependent signals are superimposed corresponding to expression (6, 6a) on a superimposition unit 9 and are finally, again corresponding to the mentioned expressions, linearly amplified on a weighting unit 10. By means of the additive signal which is, in addition, fed at the superimposition unit 9, on the one hand, the approximation which was found to be optimal according to expressions (5) and (6) is taken into account at the transition from (4) to (5) and, on the other hand, a barrier current difference is taken into account. By means of the multiplicative factor taken into account at weighting unit 10, on the one hand, exponent b of (5), which is found to be suitable for the optimal approximation, is taken into account and, on the other hand, $\lambda$ is taken into account.

The two transistors $T_1$ and $T_2$ provided for the conversion are preferably selected as a matched pair and are closely coupled thermally so that the barrier currents as well as the temperature and therefore $\lambda$ are essentially the same.

Figure 3:
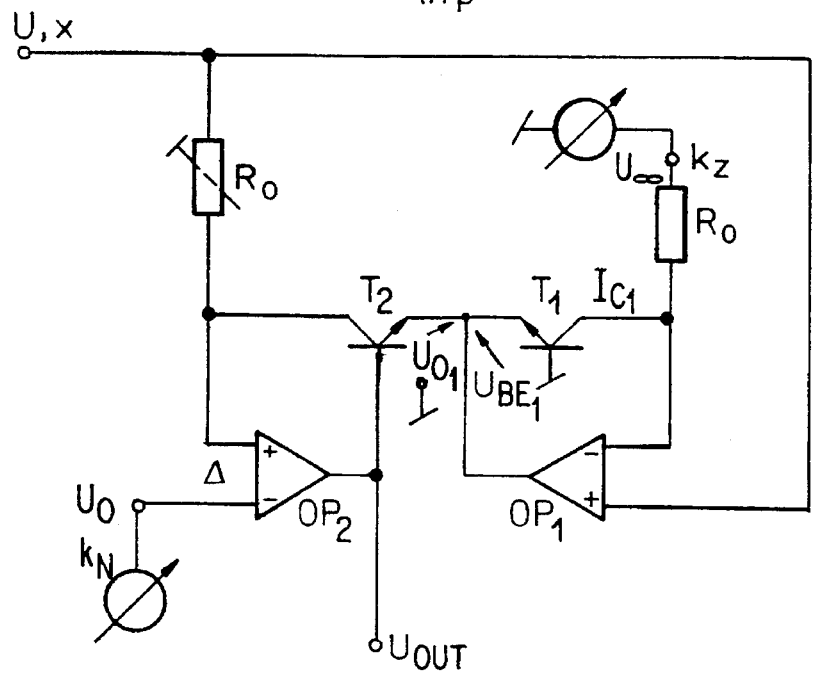
FIGS. 3 and 4 each show a different embodiment of the converter constructed according to the invention.

A first preferred embodiment of the function converter unit according to FIG. 2 is illustrated in FIG. 3. The Pirani measuring bridge voltage U or the measuring signal x is fed to the non-inverting input of a first operational amplifier $OP_1$. The Pirani voltage $U_\infty$ or $k_Z$, which is the asymptotical value for large pressure values according to FIG. 1, is fed to the inverting input via the resistor $R_o$. The operational amplifier $OP_1$ is fed back via a first bipolar transistor $T_1$ whose collector is connected with the inverting input of the operational amplifier $OP_1$ and whose emitter is connected with the output of the operational amplifier: $OP_1$. The base of the first bipolar transistor $T_1$ is connected to ground or a reference potential.

The voltage $U_o$ is fed to a second operational amplifier $OP_2$ at the inverting input corresponding to the voltage which is asymptotically supplied by the Pirani gauge at very low pressures, while, via another resistor $R_o$, the Pirani measuring voltage U or the measuring quantity x is fed to the non-inverting input of $OP_2$.

Between the non-inverting input and output of the operational amplifier $OP_2$, the base-collector path of the transistor $T_2$ is situated whose emitter is connected with the emitter of transistor $T_1$. The output of the converter circuit is marked $U_{OUT}$.

The illustrated circuit operates as follows:

The right stage with $OP_1$, $T_1$, by means of $\lambda_1$ as well as $I_{S1}$ for transistor 1, in a manner known, for example, from Miklos Herpy, "*Analog Integrated Circuits*", Franzis Publishers, München, Page 307, emits an output voltage relative to a reference potential which is found at $$U_{o1} = \lambda_1^{-1} (\ln (U_\infty - U) - (\ln R_o + \ln I_{S1})), \tag{8}$$

and which is equal to the base emitter voltage $U_{BE1}$.

While taking into account that for the differential voltage $\Delta$ on $OP_2$, the following applies, $$\Delta = U - I_{C2} R_o - U_o, \tag{9}$$

furthermore, for the output voltage of the circuit, which is equal to the output voltage of the second operational amplifier $OP_2$, the following applies:

$$U_{OUT} = G \cdot \Delta, \tag{10}$$

wherein G is the open-loop amplification of the operational amplifier $OP_2$, and that furthermore the two operational amplifier/transistor stages are related via the equation $$U_{BE2} = U_{OUT} + U_{o1} \tag{11}$$

because of the high open-loop amplification G, the following output voltage is obtained:

$$U_{OUT} = \lambda^{-1} \{\ln(U - U_o) - \ln (U_\infty - U)\}, \tag{12}$$

if the following applies:

$$\lambda_1 = \lambda_2 = \lambda \tag{13}$$

$$I_{S1} = I_{S2}.$$

In this case, different barrier currents $I_s$ of the two transistors $T_1$ and $T_2$, as indicated by an interrupted line in FIG. 3 on $R_o$ of the left stage, may be compensated by the matching of the two resistors $R_o$.

A comparison of the expression (12) for the output voltage of the converter unit according to FIG. 3 with expression (6a) or (6c) shows that, with the exception of a linear amplification factor and an additive constant, the output voltage $U_{OUT}$ of the mentioned converter circuit is logarithmically dependent on the gas pressure p measured by means of the Pirani measurement setup; and the logarithm of the output voltage is proportional to the logarithm of the pressure to be measured.

Figure 4:
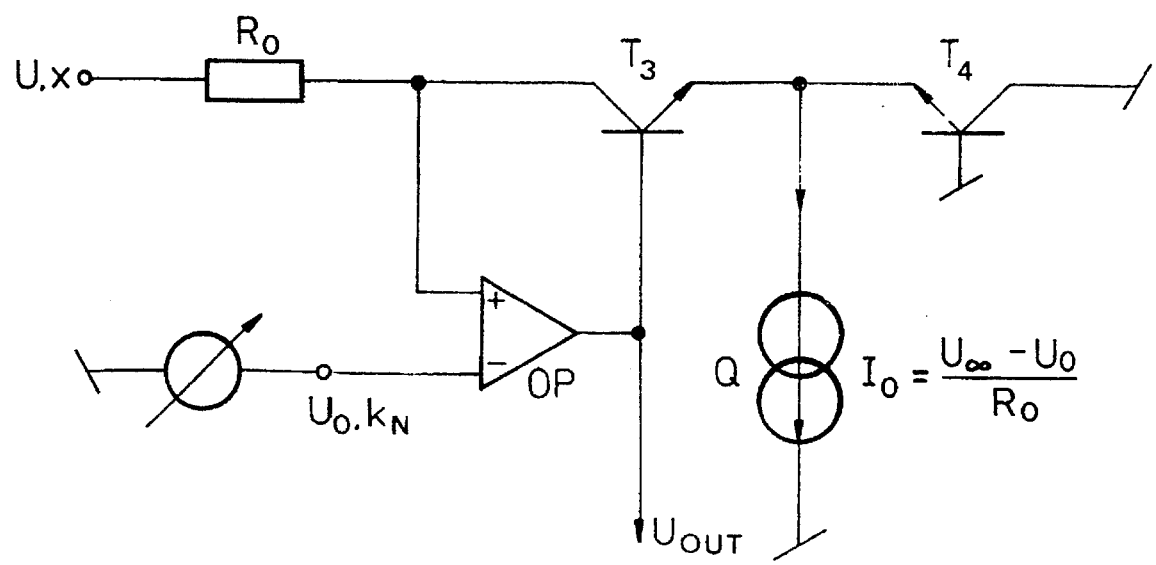

FIG. 4 illustrates another converter circuit constructed in accordance with an embodiment of the present invention. Again, the output voltage U of the Pirani bridge is shown as the measuring signal in this circuit as well as, in a generalized manner, the measuring signal x. In this embodiment of the converter, the measuring signal x and the measuring voltage U are fed via a resistor $R_o$ to the non-inverting input of an operational amplifier OP. The inverting input of the operational amplifier OP is fed the voltage value $U_o$ which is taken up asymptotically in the case of low pressures. Via the base-collector path of a bipolar transistor $T_3$, the output of the operational amplifier OP is fed back to the non-inverting input of this amplifier OP. The emitter of transistor $T_3$ is connected with that of another transistor $T_4$.

The base and the collector of transistor $T_4$ are connected to the reference potential, in the illustrated embodiment, to ground. A tunable direct-current source Q is connected between the coupled emitters of the transistors $T_3$ and $T_4$ and the reference potential. The source current $I_o$ is set to the value $$I_o = \frac{U_\infty - U_o}{R_o}. \quad (14)$$

For the differential voltage Δ at the operational amplifier input, expression (9) continues to apply; likewise, for the output voltage $U_{OUT}$ and the two base emitter voltages of transistors $T_3$ and $T_4$, equation (11) continues to apply.

When taking into account equation (14), the output voltage according to equation (12) is obtained, with equation (13).

By means of the currently preferred embodiment according to FIG. 4, used for the analysis of the Pirani vacuum gauge output voltage U, a precision of approximately ±10% of the converter output signal relative to the pressure value, in a pressure range of from $10^{-3}$ mbar to $10^3$ mbar (i.e., six decades) was achieved in comparison to the respective adjusted gas pressure p. In view of the extremely large measuring range, this precision, which is achieved with the simple suggested devices, is surprising.

Figure 5:
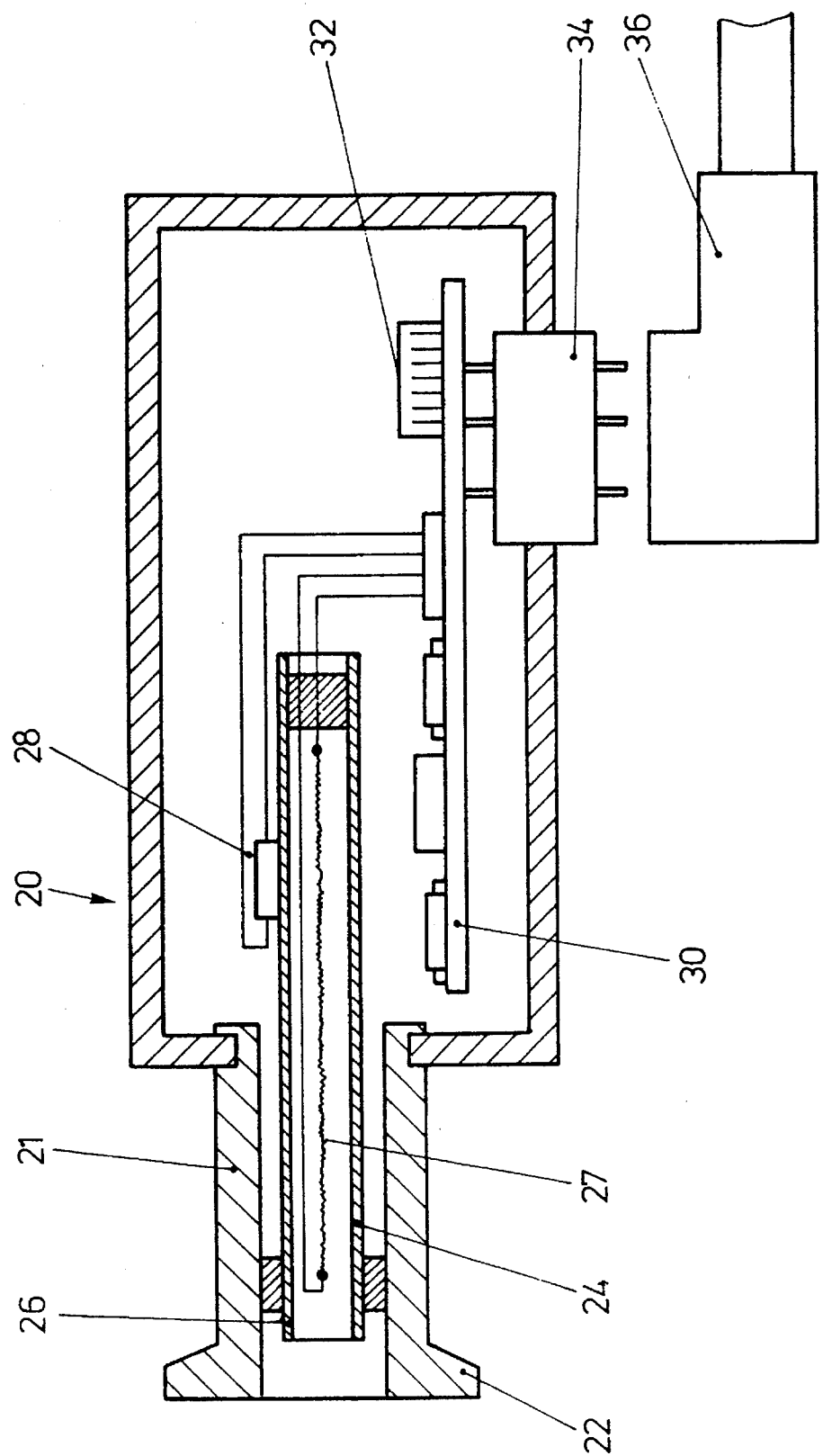
FIG. 5 is a schematic view of a measuring head according to the invention comprising the sensor, and the integrated converter according to the invention.

The approach according to the present invention and in particular the circuits according to the embodiments of FIGS. 3 and 4 or also other possibilities for implementing the invention according to FIG. 2 leads to circuits with a small number of electronic components which allows integration of the converter directly into a measuring head or into a measuring sensor device. Thus, it becomes possible to directly integrate a sensor with at least one Pirani vacuum gauge head or a Pirani vacuum gauge bridge into the converter to form a vacuum gauge measuring head. A measuring head of this type is schematically illustrated in FIG. 5 and is described below.

A measuring head housing 20 comprising a measuring tube 21 leads out on a vacuum flange 22. The Pirani element 24 formed by an exterior tube 26 and the Pirani measuring wire 27 is arranged in the measuring tube 21. Outside the thermally conducting exterior tube 26 which is mounted largely thermally insulated in the housing 20, a temperature compensation element 28 is arranged which electrically is part of the Wheatstone bridge elements which, with the exception of the Pirani heating wire, are mounted on an electronic print plate 30.

At reference number 32, the heat sink is illustrated for the transistors described for the embodiments of FIGS. 3 and 4. The measuring head is connected via a plug connection 34 with a connection 36 to a display unit or a measuring computer. In addition to the described measuring bridge, the converter according to the invention is mounted on the electronic print plate 30 in a preferred embodiment according to FIGS. 3 or 4 and in the current embodiment according to FIG. 4.

Figure 6:
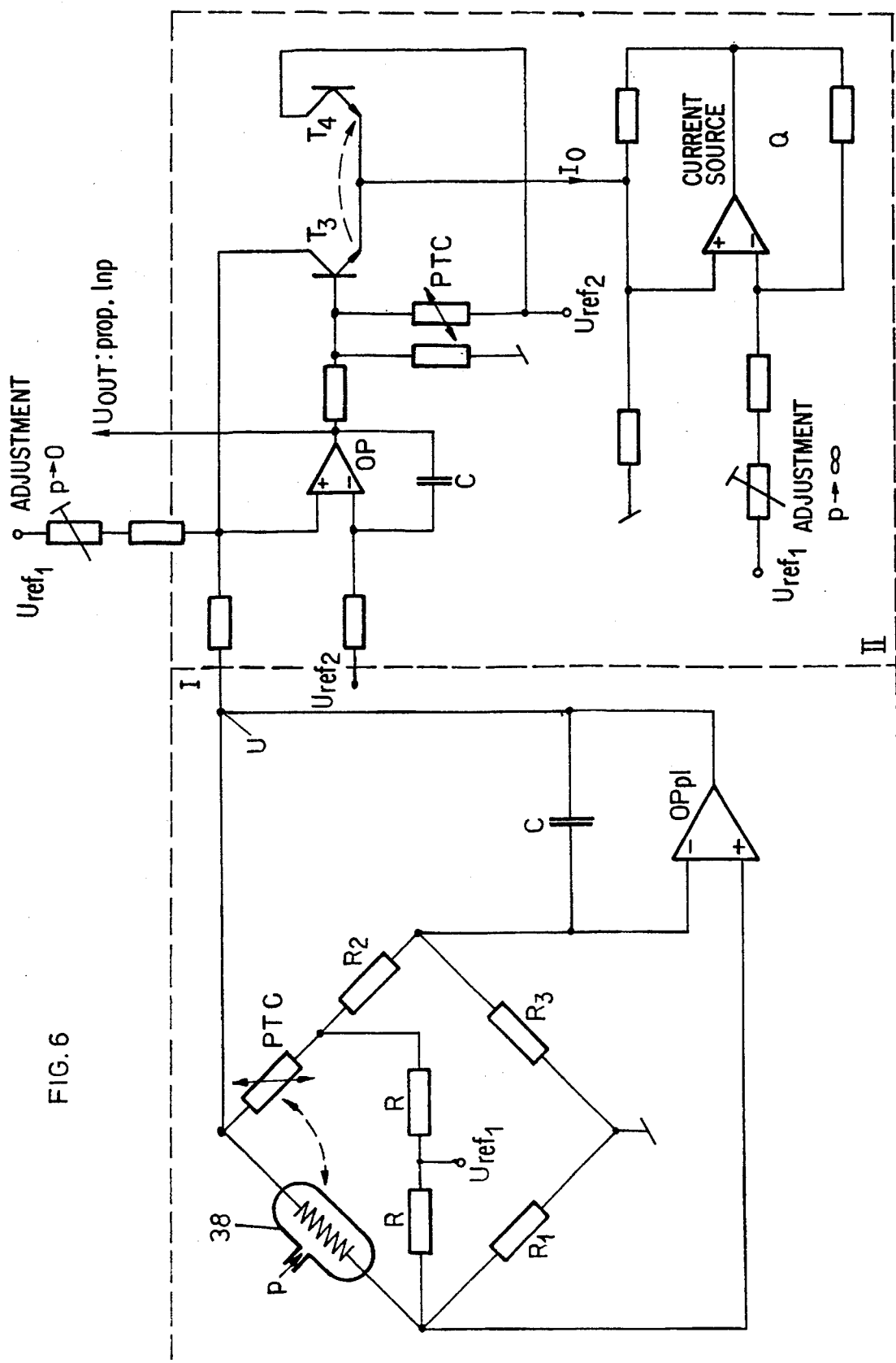
FIG. 6 shows a complete measuring head circuit with the Pirani measuring circuit according to the present invention.

In FIG. 6, the Pirani measuring circuit according to the invention is surrounded by an interrupted line and marked by I; the circuit of the converter according to FIG. 4 is also surrounded in this manner and marked by II. With respect to the converter block II, the same reference symbols are used as in FIG. 4.

The Wheatstone measuring bridge comprises the Pirani element 38 in a bridge branch, the resistors $R_1$, $R_3$, $R_2$, and another temperature-dependent element, as illustrated in the form of the positive temperature coefficient (PTC) resistance element. The PTC resistance element is thermally closely coupled with the Pirani element 38 and corresponds to the element 28 of FIG. 5.

The measuring voltage is tapped on one measuring bridge diagonal by means of an operational amplifier $OP_{pi}$ operated as a differential amplifier. The output signal of the operational amplifier $OP_{pi}$ is fed as the bridge operating voltage to the second bridge diagonal. C indicates the stabilization capacitances.

The measuring bridge branch with the PTC-element has an intermediate tap. Between the intermediate tap and that bridge point at which the Pirani element and the resistor $R_1$ are connected, a voltage source with a reference voltage $U_{ref1}$ is connected and is connected to the connecting points via respective resistors R. At room temperature, the resistances of the Pirani measuring wire and of $R_1$ are essentially identical, just like the resistance values of $R_3$ and the sum of PTC and $R_2$.

As illustrated, an extremely elegant bridge circuit is implemented in this manner which has a single temperature-dependent compensation circuit element and the setting possibility at $U_{ref1}$. Naturally, instead of a PTC-element, a negative temperature coefficient (NTC)-element may be provided in the bridge branch with $R_3$.

The converter stage II corresponds to that discussed with reference to FIG. 4, with the exception of the significant additional characteristic that another PTC is connected between the two bases of $T_3$ and $T_4$ and is connected to another reference voltage $U_{ref2}$, this PTC-element being thermally closely coupled with the transistors $T_3$, $T_4$. The differences between the transistors $T_3$, $T_4$ with respect to the barrier currents and are therefore compensated. The circuit Q provides a current source $I_o$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for measuring a physical signal by tapping off an electric signal, whereby the physical signal depends on the electric signal as follows $$y = k_1 \frac{x^2 - k_N^2}{k_Z^2 - x^2}$$

wherein:
  y is the physical signal,
  x is the tapped off electric signal,
  $k_N$ is the value of the tapped off electric signal which is asymptotically assumed when the physical signal is vanishing,
  $k_Z$ is the value of the tapped off electric signal which is assumed when the physical signal becomes infinite,
  $k_1$ is a constant, the method comprising the steps of:
    generating a further electric signal from the tapped off electric signal by processing said tapped off electric signal as follows:

$Y' = \text{prop}[\ln(x-k_N) - \ln(k_Z-x)]$, wherein y' is the further electric signal; and
    exploiting the further electric signal as dependent on the physical signal by $y' = \ln y$ wherein said further electric signal is generated by applying to respective collectors of two bipolar transistors a current proportional to $(x-k_N)$ and $(k_Z-x)$ and by exploiting the resulting emitter base voltages of said two bipolar transistors.

2. The method of claim 1, wherein said electric signal is the voltage tapped off a Pirani pressure measuring device and said physical signal is the pressure sensed by said Pirani type pressure measuring device.

3. The method of claim 1, further comprising thermally linking said two bipolar transistors to maintain them on substantially equal temperatures.

4. The method of claim 1, further comprising the step of adjusting the barrier currents of said two transistors to be substantially equal.

5. The method of claim 1, further comprising optimizing fitting of y' and lny by multiplying y' with an adjustable constant and adding to y' a further adjustable constant electric signal and adjusting said constants for optimal fit.

6. A measuring converter for converting a tapped off electric signal into an electric signal representing a physical signal to be measured, wherein said tapped off electric signal and said physical signal depend as follows:

$$y = k_1 \frac{x^2 - k_N^2}{k_Z^2 - x^2}$$

wherein y is the physical value, x is the tapped off electric signal, $k_N$ is the value of x asymptotically assumed as y becomes vanishing, $k_Z$ is the value of x asymptotically assumed as y becomes infinite, comprising at least two bipolar transistors, the collectors thereof being fed by respective currents proportional to $(x-k_N)$ and to $(k_Z-x)$, the base-emitter voltages of said two bipolar transistors being subtracted from each other so as to generate a further electric signal according to $y'=\text{prop}[\ln(x-k_N)-\ln(k_Z-x)]$, said further electric signal y' being output as a signal proportional to lny.

7. The converter of claim 6, wherein one of said two bipolar transistors is connected with its emitter-collector stage between the output and the negative input of an operational amplifier.

8. The converter of claim 7, wherein the collector-base state of the other of said two bipolar transistors is connected between output and non-inverting input of a second operational amplifier and that the emitters of said two bipolar transistors are connected to each other, whereby the output of said converter is connected to the output of said second operational amplifier.

9. The converter of claim 6, Wherein the collector-base stage of one of said two bipolar transistors forms a feedback loop from the output of an operational amplifier to its input.

10. The converter of claim 9, wherein the collector and the base of the other of said two bipolar transistors is connected on a same reference potential and that the emitters of both bipolar transistors are connected, whereby said two linked emitters are connected via a constant current source to said reference potential.

11. The converter of claim 6, comprising at least one of a positive temperature coefficient resistive element and of a negative temperature coefficient resistive element thermally coupled with one of said two bipolar transistors so as to be maintained at substantially the same temperature.

12. The converter of claim 6, further comprising a Pirani sensor element sensing said physical value and generating said electric signal.

13. The converter of claim 12, wherein said Pirani sensor element is integrated into said converter.

14. The converter of claim 12, further comprising a bridge circuit with said Pirani sensor element, said bridge circuit comprising a bridge branch with an intermediate tap, a voltage source being connected via at least one resistive element between a bridge corner point and said tap, and further comprising at least one of a positive temperature coefficient and of a negative temperature coefficient resistive element in said bridge circuit.

15. The converter of claim 13, wherein one temperature dependent resistive element is provided which is thermally coupled with said Pirani sensor element so as to be substantially at the same temperature.

16. The converter of claim 14, wherein a difference amplifier is provided with its input connected to a diagonal of said bridge circuit, the output signal of said difference amplifier being applied across the second diagonal of said bridge circuit.

* * * * *